(12) United States Patent
Gessler

(10) Patent No.: US 6,739,826 B2
(45) Date of Patent: May 25, 2004

(54) SLAB TRANSFER HANDLING SYSTEM

(75) Inventor: Donald A. Gessler, Verona, PA (US)

(73) Assignee: Kvaerner U.S. Inc., Pittsburgh, PA (US)

( * ) Notice: Subject to any disclaimer, the term of this patent is extended or adjusted under 35 U.S.C. 154(b) by 0 days.

(21) Appl. No.: 10/083,787

(22) Filed: Feb. 25, 2002

(65) Prior Publication Data
US 2003/0118435 A1 Jun. 26, 2003

Related U.S. Application Data
(60) Provisional application No. 60/271,601, filed on Feb. 26, 2001.

(51) Int. Cl.[7] .............................................. B65G 59/04
(52) U.S. Cl. ..................... 414/797.1; 294/65.5; 414/21; 414/626; 414/736; 414/737
(58) Field of Search ........................ 414/796.5, 797.1, 414/793.2, 626, 627, 21, 732, 734, 736, 737, 738, 796.9, 797; 294/65.5; 901/40

(56) References Cited

U.S. PATENT DOCUMENTS 2,204,207 A * 6/1940 Coburn .................... 414/797.1
3,862,749 A 1/1975 Fieser et al.
4,044,894 A * 8/1977 McDonald et al. ...... 414/626 X
4,138,961 A 2/1979 Roper
4,378,547 A 3/1983 Goedhart et al.
4,414,522 A 11/1983 Rybak
4,480,714 A * 11/1984 Yabuta et al. ............. 414/21 X
5,169,275 A 12/1992 Kratz
5,544,408 A 8/1996 Tippins et al.
5,579,569 A 12/1996 Tippins et al.
6,145,364 A 11/2000 Tippins et al.

FOREIGN PATENT DOCUMENTS

JP  53-119563  * 10/1978  .............. 414/797.1
JP  53-140775  * 12/1978  .............. 414/797.1

* cited by examiner

Primary Examiner—Janice L. Krizek
(74) Attorney, Agent, or Firm—Reed Smith LLP

(57) ABSTRACT

A system for transferring a steel slab from a first roller table to a second roller table by lifting the top slab from a stack of slabs on the first table, and then transferring and lowering the slab onto the second table. Specifically, a gantry-type bridge trolley mechanism having suspended electromagnets is provided that is motor driven on a cantilevered runway over the slab unpiler table and the furnace table. A stabilizer system minimizes sway of the electromagnets and the slabs.

11 Claims, 13 Drawing Sheets

CRANE OVER TRANSFER TABLE
(MAGNETS IN RAISED POSITION READY TO PICK UP SLAB)

CRANE OVER TRANSFER TABLE
(MAGNETS LOWERED TO SLAB)

CRANE OVER TRANSFER TABLE AT MAX. TRAVEL
(MAGNETS IN RAISED POSITION READY TO PICK UP NARROW SLABS)

CRANE OVER TRANSFER TABLE AT MAX. TRAVEL
(MAGNETS LOWERED TO PICK UP NARROW SLABS)

SLAB TRANSFER HANDLING SYSTEM

CROSS REFERENCES TO RELATED APPLICATIONS

This application claims the benefit under 35 U.S.C. §119 (e) of U.S. provisional application No. 60/271,601 filed Feb. 26, 2001.

FIELD OF THE INVENTION

This invention relates to a system for transferring objects. In particular, the present invention relates to a system for transferring steel slabs.

BACKGROUND OF THE INVENTION

Steel slabs are semi-finished products obtained in the steel industry. A typical slab may weigh between 20 and 50 tons. Subsequent to casting, slabs are sent to a hot stripmill to be rolled into coiled sheet and plate products.

In a prior arrangement, stacks of steel slabs of various lengths are received from an overhead crane at a slab receiving roller table in a slab receiving area of a hot strip mill. Typical stacks consist of five slabs. The stack is then transferred by roller tables to a slab unpiler roller table. The slab unpiler table is lowered so that the bottom of the top slab of the stack is approximately level with the top of a parallel furnace charging table. Each slab is transferred perpendicularly to the rolling direction from the slab unpiler table to the furnace charging table by a pushing mechanism. The pushing mechanism pushes each slab across the slab upon which it is resting (unless it is the bottom slab of the stack) and onto the furnace charging table. Often slabs are bowed and at ambient temperature can also be at 1000° F. when hot charging is required.

Problems arise in that pushing slab over slab or directly over the roller table causes marking, etching and deformation of the slabs, which in turn affects the quality of the end product. Also, the pusher system typically cannot maintain the production time required by the pre-heat furnaces.

Accordingly, an advantage exists for a system to transfer slabs efficiently while minimizing damage.

SUMMARY OF THE INVENTION

The present invention provides a system for transferring a steel slab from a first roller table to a second roller table by lifting the top slab from a stack of slabs on the first table, and then transferring and lowering the slab onto the second table. Specifically, in a presently preferred embodiment, the present invention provides a gantry-type bridge trolley mechanism that is motor driven on a cantilevered runway over the slab unpiler table and the furnace charging table. The cantilevered system provides a space-saving advantage by limiting the necessary supports to only one side of the roller tables. Alternatively, in situations where space is not a factor, a crane having supports on both sides of the roller tables could be provided. A lifting device on the trolley mechanism is powered by a self-contained hydraulic actuator with its own power source. The actuator is connected to a center lever arm that is mounted to a horizontal torsional shaft. Spaced on the horizontal shaft are at least two and preferably four additional lever arms. The lever arms are preferably but not necessarily spaced apart at an equal spacing (in instances using three or more arms). Spacing the lever arms unequally along the horizontal shaft ensures that the shortest slabs can be picked up. A vertical rod suspending an electromagnet is operationally connected to each additional lever arm. Each vertical rod and electromagnet combination is structurally designed to be able to support a slab. Although not required, it is desired to have at least two electromagnets pick up a slab for stability purposes. While in the most preferred embodiment four vertical arm and electromagnet combinations are provided, it should be apparent that other numbers are contemplated. Optionally, and preferably, each vertical rod includes a load cell which is operationally connected to a control unit to measure the weight of each slab. Each vertical rod is also provided with a stabilization system to eliminate sway of the vertical rods. While a single actuator preferably controls the vertical position of the electromagnets, each vertical rod and electromagnet combination may have independent actuators.

In operation, the trolley mechanism which is driven by powered wheels positions the electromagnets over the stack of slabs on the slab unpiler table. The hydraulic actuator lowers the electromagnets so that the electromagnets make magnetic contact with the top slab. The hydraulic actuator then causes the electromagnets to lift the slab. The trolley mechanism then positions the slab over the furnace charging table. The mechanism then lowers and releases the slab onto the furnace charging table.

A programmed control unit reads the slab's weight, lift and transfer path.

Lifting the slabs (as opposed to pushing them off the stack) minimizes marking and deformation of the slabs, enabling a higher quality end product. The present invention also provides increased production rates by transferring a 1000° F. slab in about 36 seconds as compared to the pushing mechanism transfer time of about 45 seconds. Production capacity is increased to 300 slabs in an 8-hour period.

BRIEF DESCRIPTION OF THE DRAWINGS

The present invention and its presently preferred embodiments will be better understood by way of reference to the detailed disclosure herebelow and to the accompanying drawings, wherein.

DESCRIPTION OF THE PREFERRED EMBODIMENTS

Figure 1:
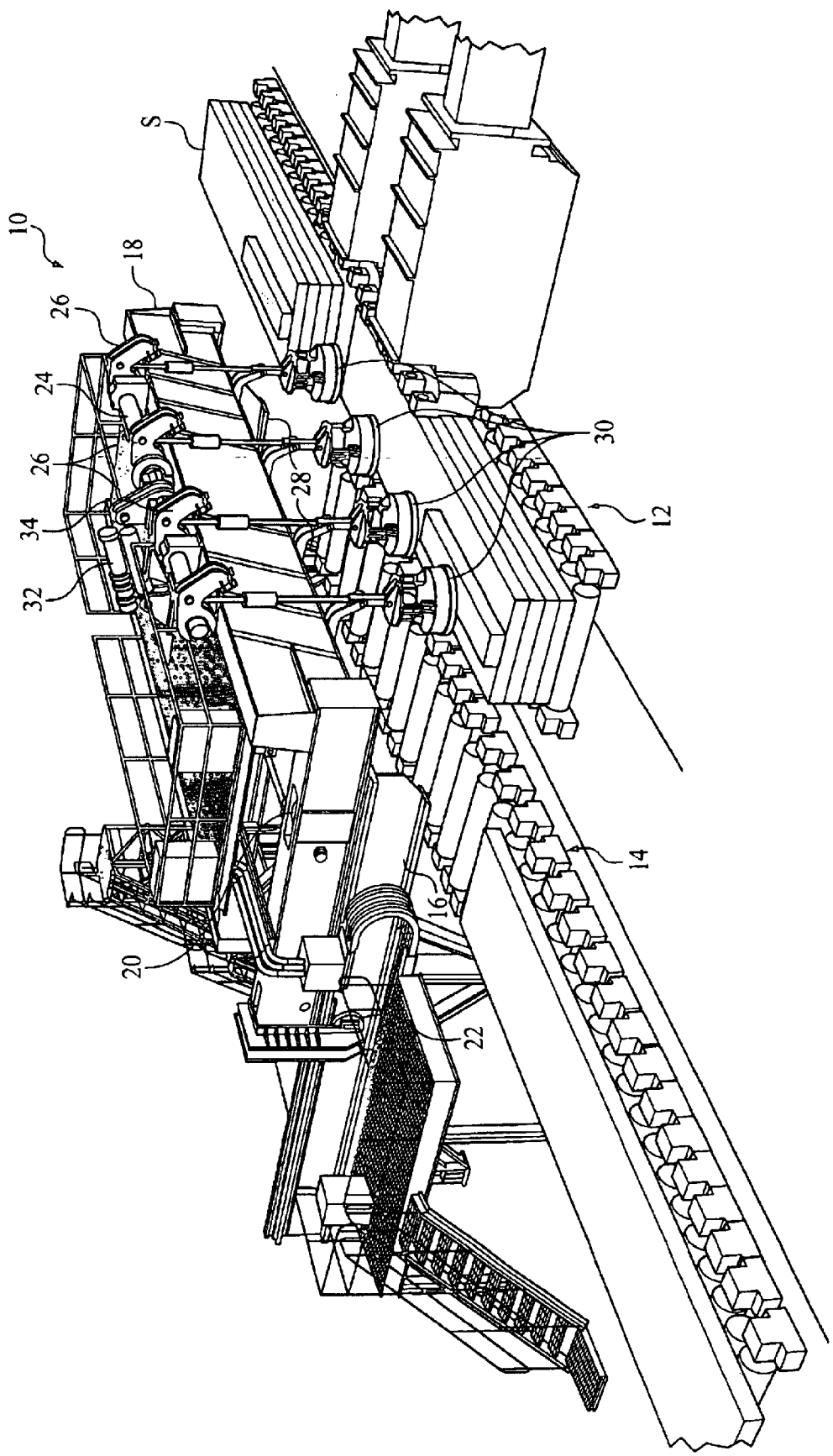
FIG. 1 is an elevational view of the slab handling transfer system of the present invention.
Figure 3:
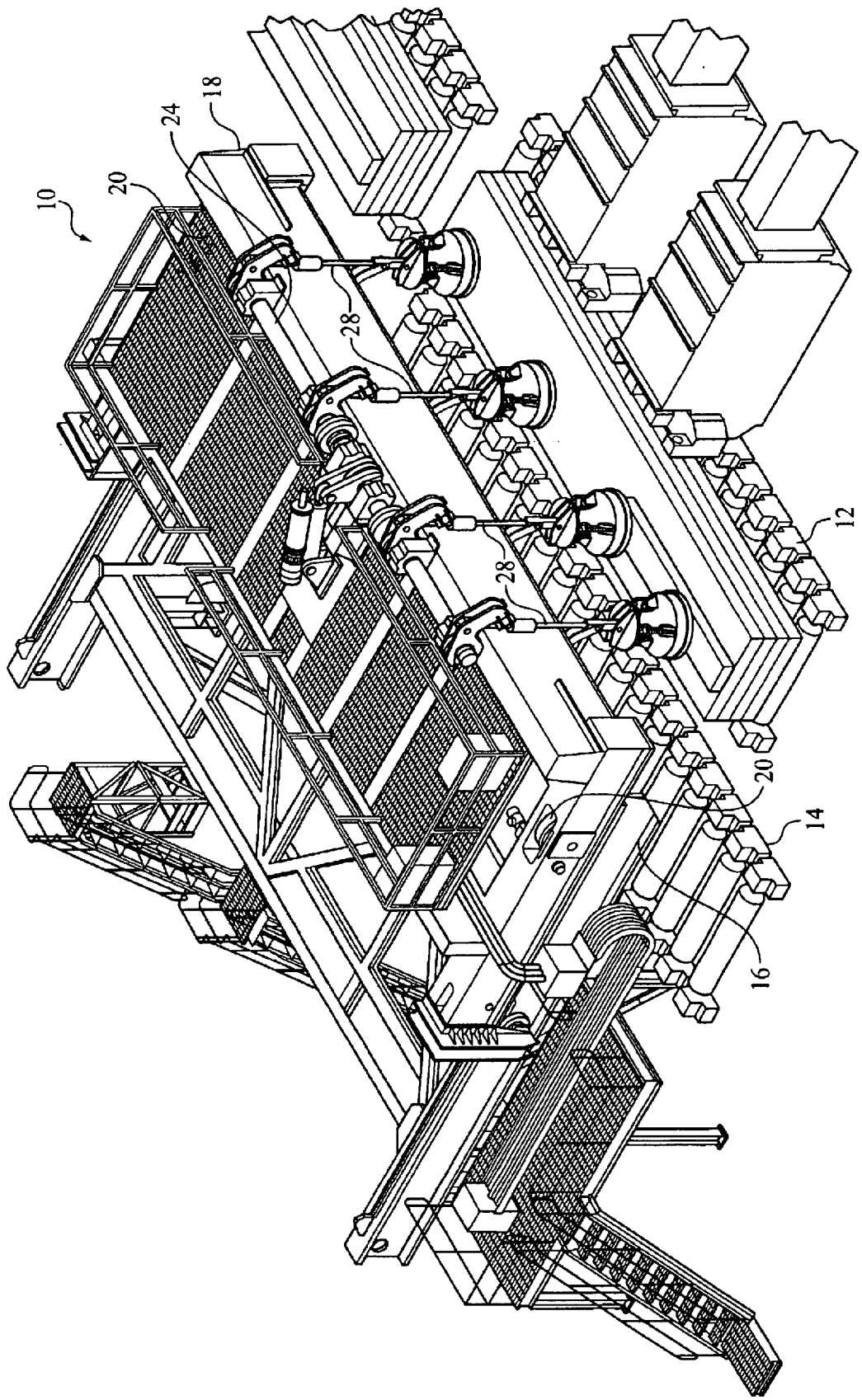
FIG. 3 is a higher elevational view of the slab handling transfer system of the present invention.
Figure 4:
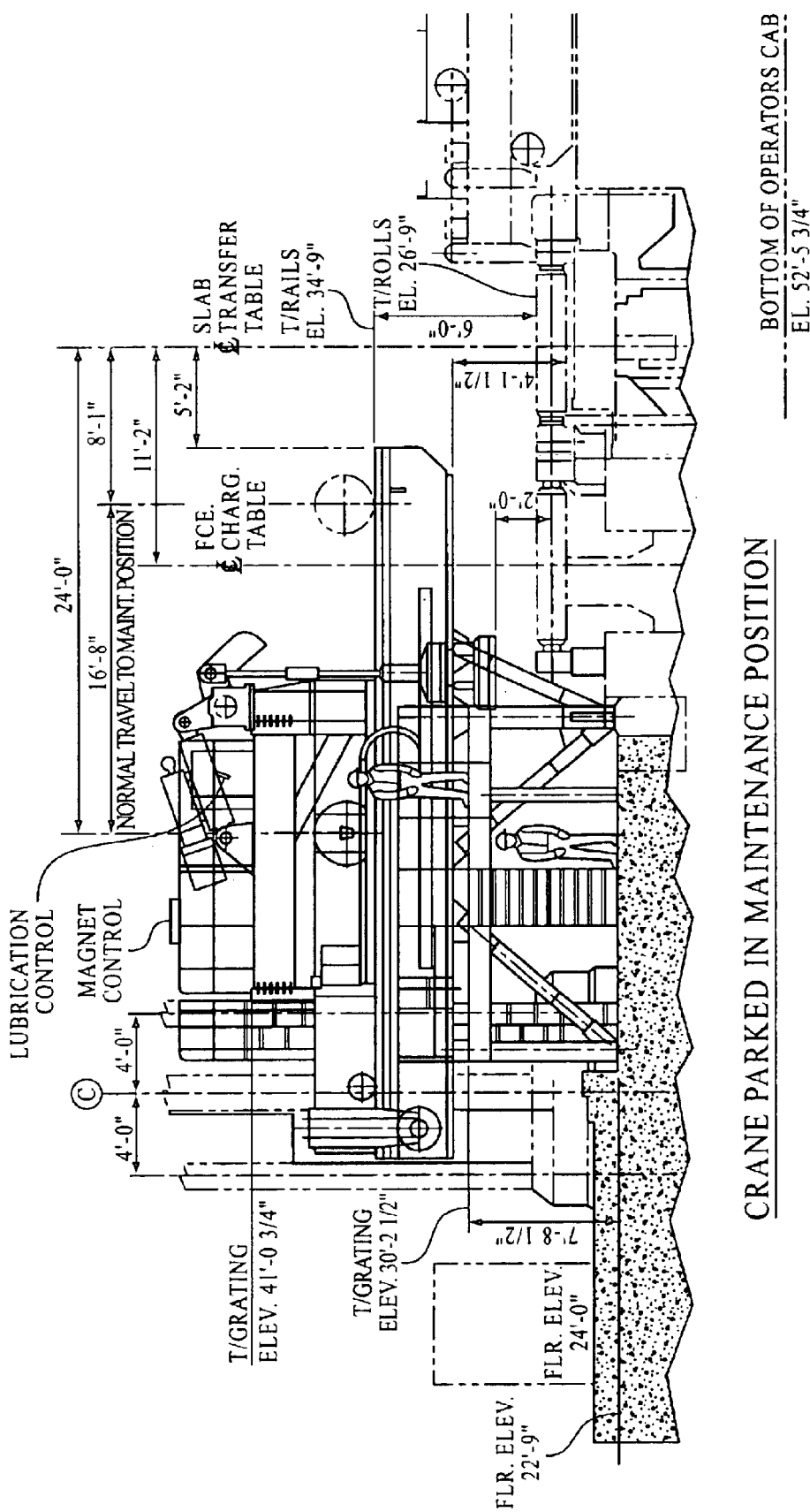
FIGS. 4–9 are end views showing the sequence of movement of the system of the present invention.
Figure 11:
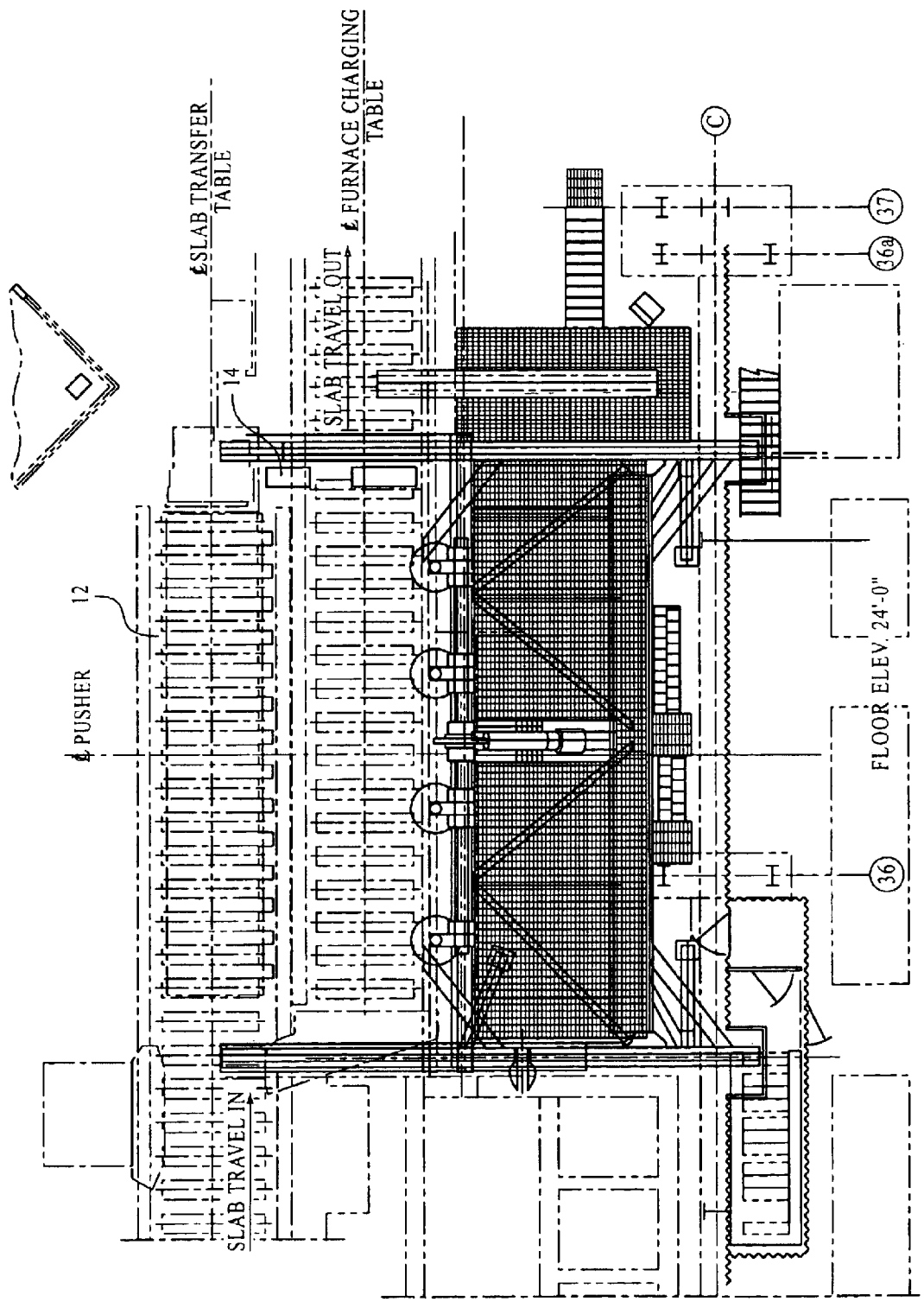
FIG. 11 is a top view showing the system of the present invention having the electromagnets positioned over the furnace charging table.
Figure 12:
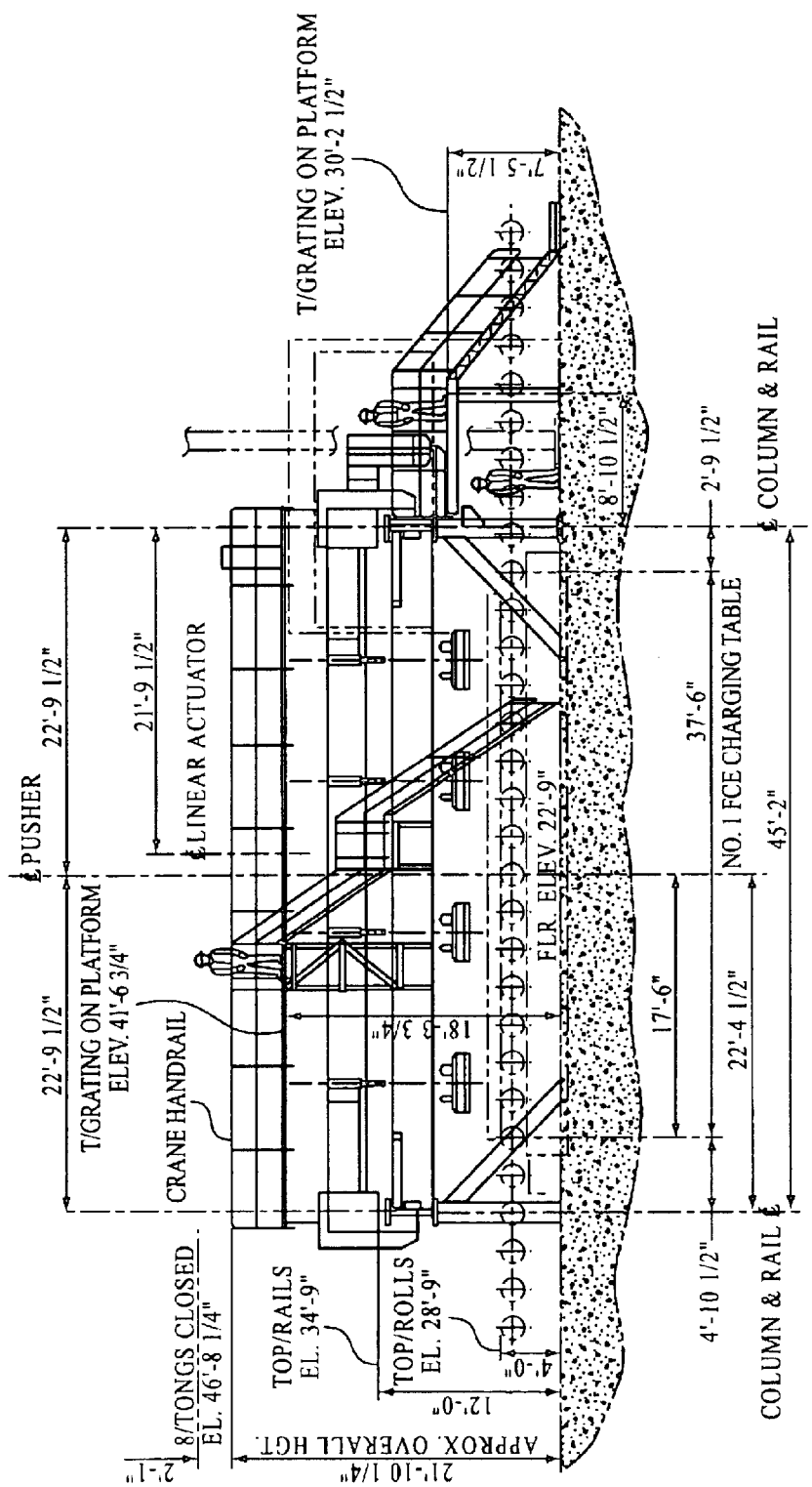
FIG. 12 is a side elevational view of FIG. 10.
Figure 13:
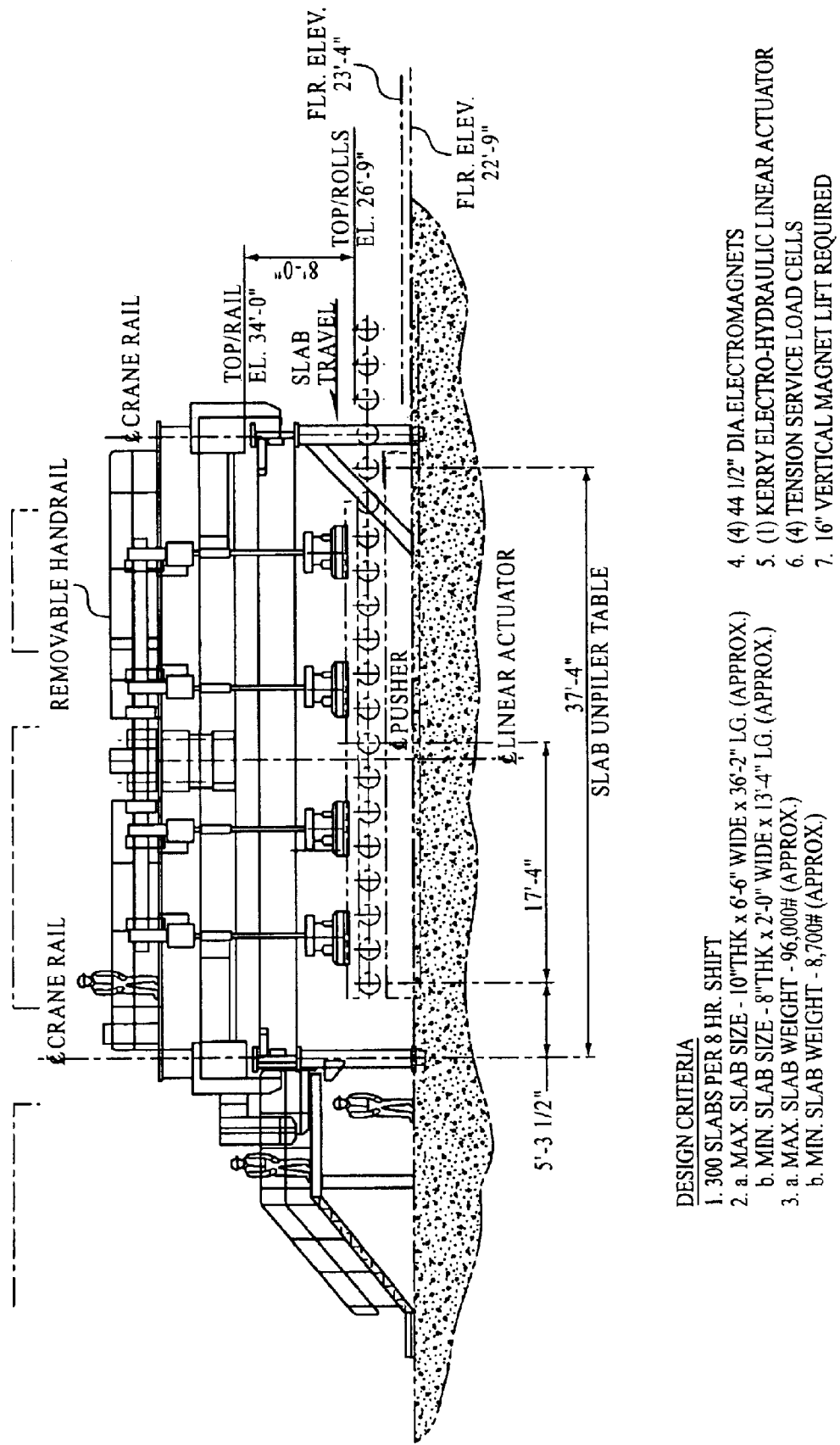
FIG. 13 is a side elevational view of FIG. 11.

Referring to FIGS. 1 and 3, the general system 10 according to the invention is illustrated. Preferably the present system is provided to transfer steel slabs between a slab unpiler table 12 and a furnace charging table 14 spaced from and parallel to said slab unpiler table 12. Furnace charging table 14 is positioned at the entrance of a pre-heat furnace (not illustrated). Slab unpiler table 12 and furnace charging table 14 are preferably conveyor roller tables. A cantilevered runway 16 extends from adjacent the furnace charging table 14 and across the furnace charging table 14. A carriage or trolley mechanism 18 rides along the runway 16 and is supported by a pair of powered drive wheels 20. A pair of lift wheels 22 on the trolley mechanism 18 provide additional support and also ride along the cantilevered runway 16. When positioned at its most advanced position, the trolley mechanism 18 is positioned over the slab unpiler table 12 (FIGS. 6–9). When retracted, the trolley mechanism 18 is positioned over the furnace charging table 14. When retracted further, the trolley mechanism 18 is positioned so that it is not above either table for maintenance purposes (FIGS. 4 and 11).

At the upper distal end of the trolley mechanism 18, a horizontal mounted shaft 24 is provided having at least two and preferably four spaced lever arms 26. A vertical rod 28 is connected to each lever arm and an electromagnet 30 is suspended at the lower end of each vertical rod. Preferably, the lever arms 28 are spaced apart at unequal intervals. Ideally, the two lever arms 28 positioned at the end of the horizontal shaft 24 nearest the furnace are spaced closer together than the other lever arms. This ensures the shortest slabs will be picked up by at least two electromagnets 30.

Figure 2:
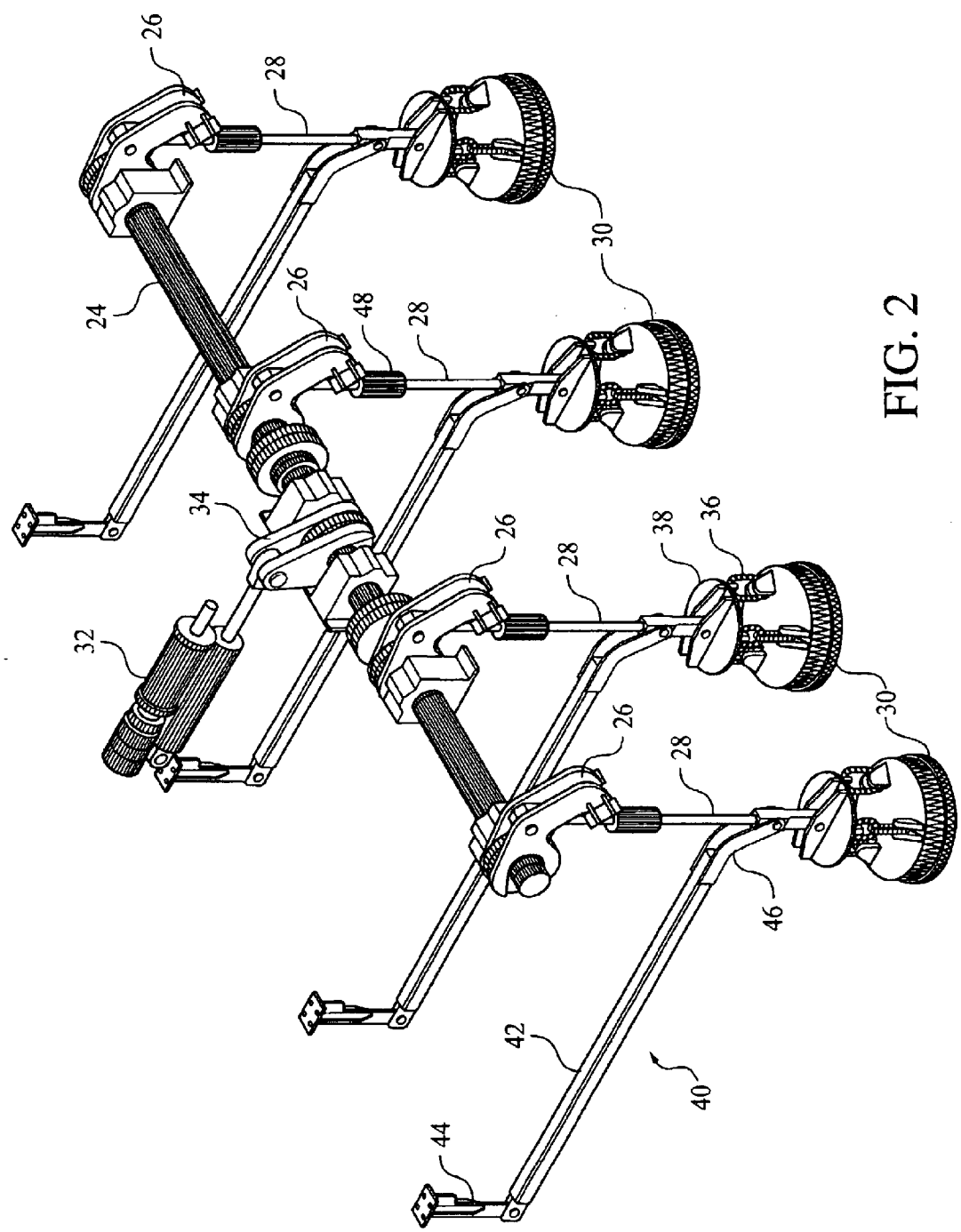
FIG. 2 is partial elevational view showing the lifting apparatus of the present invention.

A single hydraulic actuator 32 (as best seen in FIG. 2) is connected to a center lever arm 34 that is mounted on the horizontal shaft 24. Actuation of the hydraulic actuator 32 causes the center lever arm 34 to pivot, thus, causing the horizontal shaft 24 to rotate which in turn causes the unequally spaced lever arms 26 to pivot. Pivoting of the unequally spaced lever arms 26 raises and lowers the vertical rods 28 and thus, the electromagnets 30.

Each electromagnet 30 is suspended by at least one and preferably three chain linkages 36 to a horizontal disk 38 which is pivotally connected to the lower end of the vertical rod. This allows the electromagnet 30 to adjust its orientation to the slab.

A stabilization system 40 to eliminate sway of the vertical rods 28 is preferably provided. The stabilization system comprises a stabilization arm 42 connected to each vertical rod 28.

Each stabilization arm 42 is pivotally connected at one end to a vertical post 44 which is connected to the underside of the trolley mechanism 18. The opposite end of each stabilization arm 42 includes a curved down-turned portion 46 which is pivotally connected to the vertical rod 28 above the horizontal disc. The stabilization arm 42 limits the movement of the electromagnet 30 in the vertical plane and minimizes movement in the horizontal plane.

Each vertical rod 28 is also provided with a commercially available load cell 48 to weigh the slabs. The load cells 48 are operationally connected to a control unit (not illustrated). The force and timing of each electromagnet is set on the control unit to pick up only the top one slab at a time.

Figure 5:
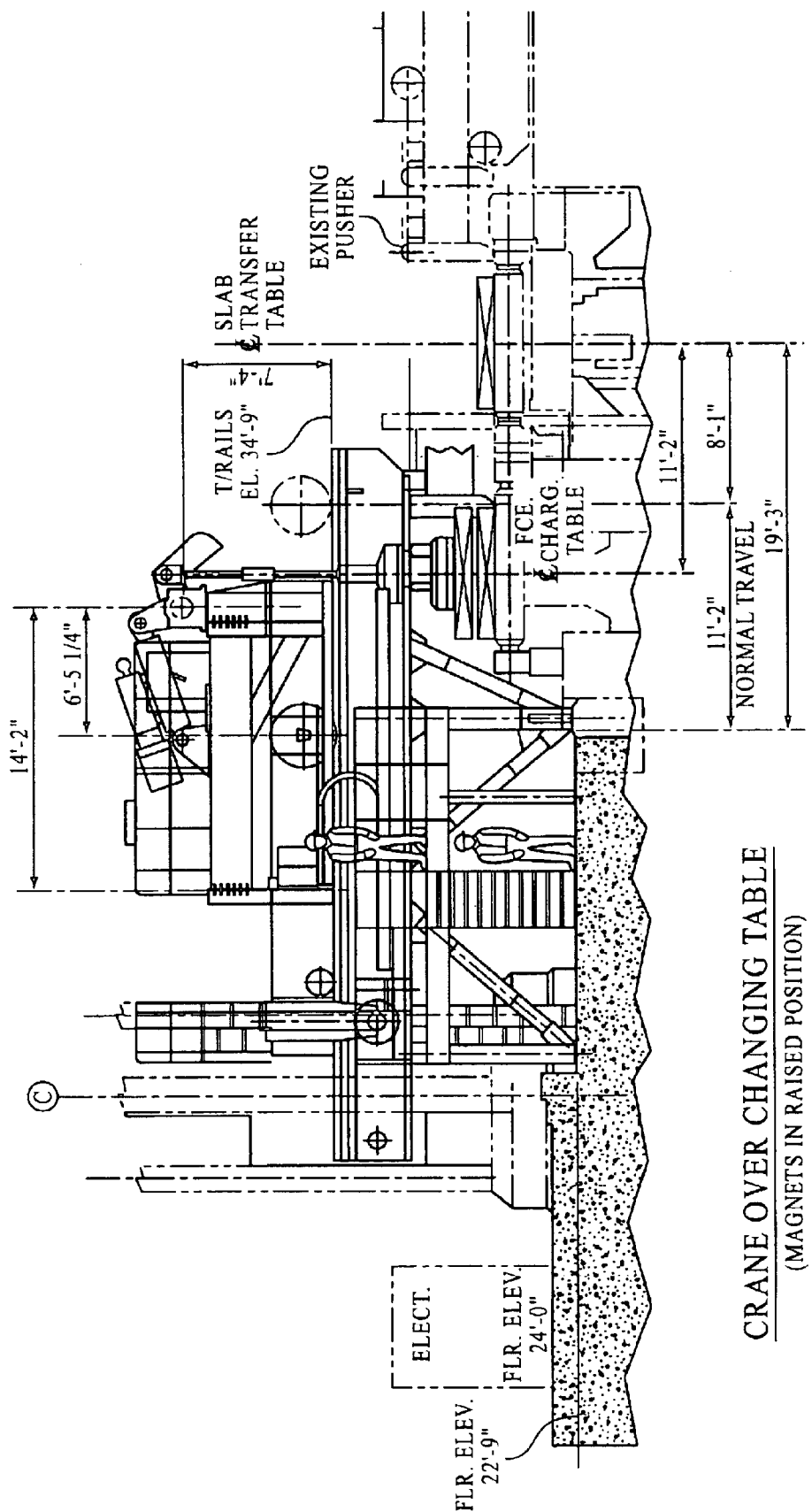
Figure 6:
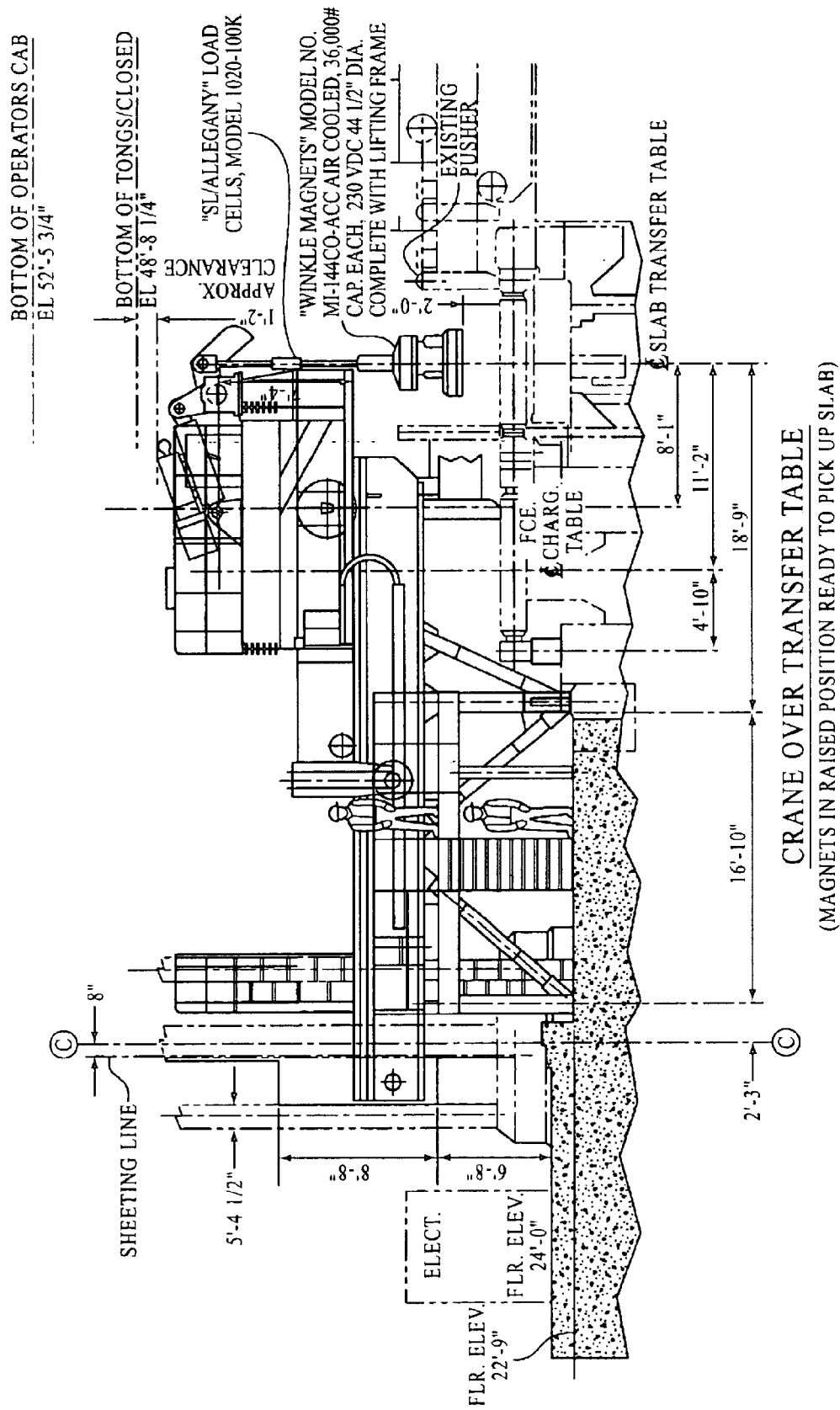
Figure 7:
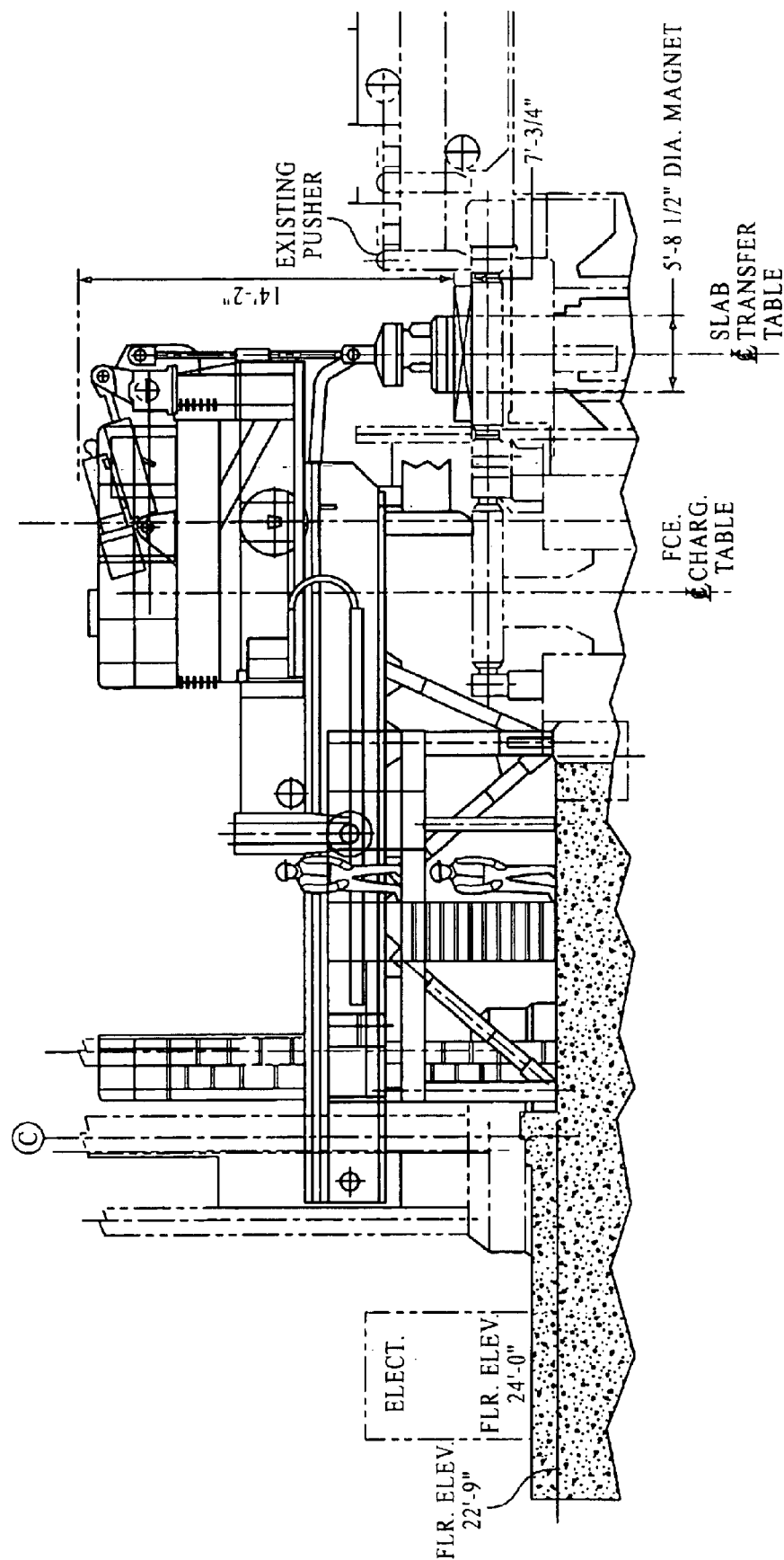
Figure 8:
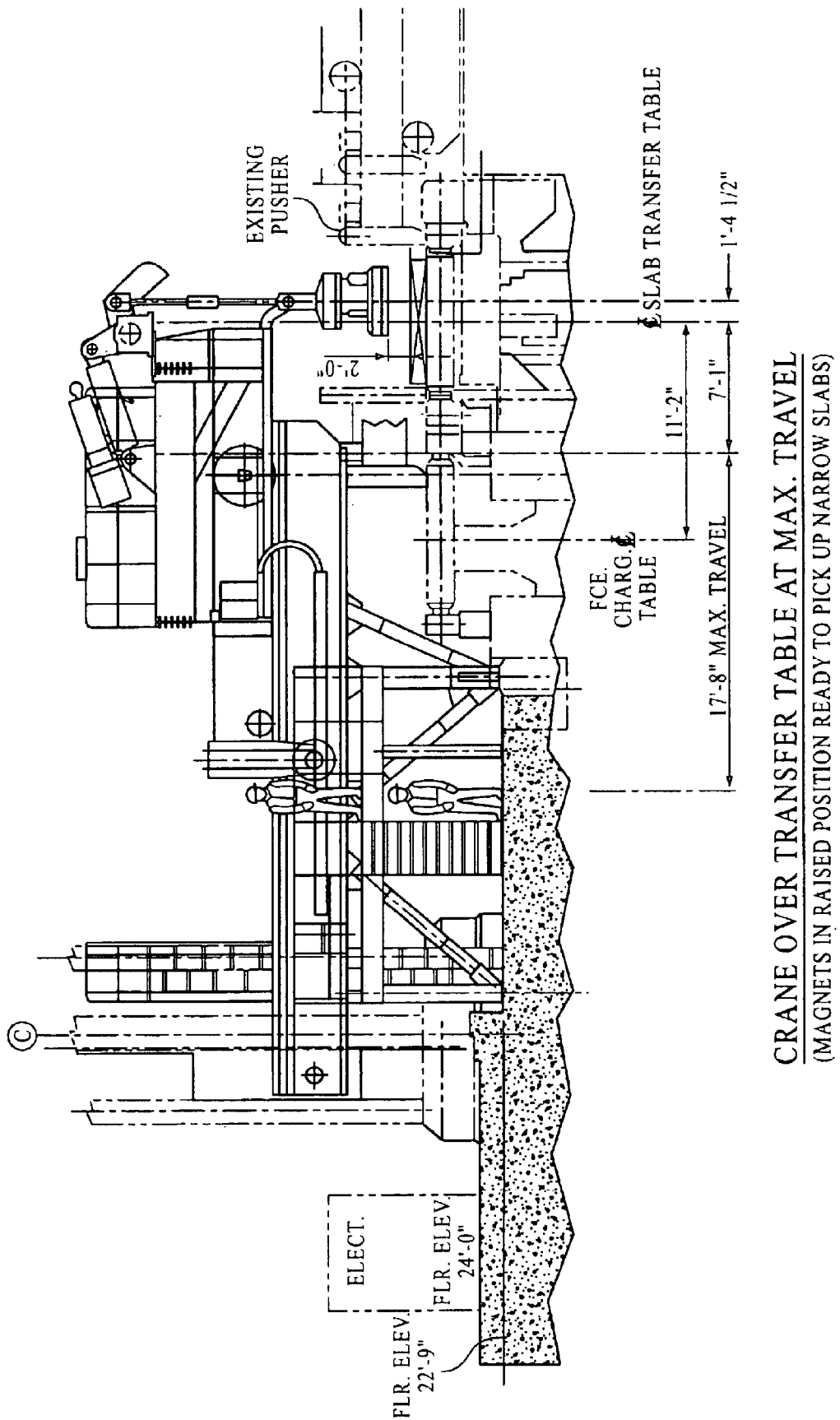
Figure 9:
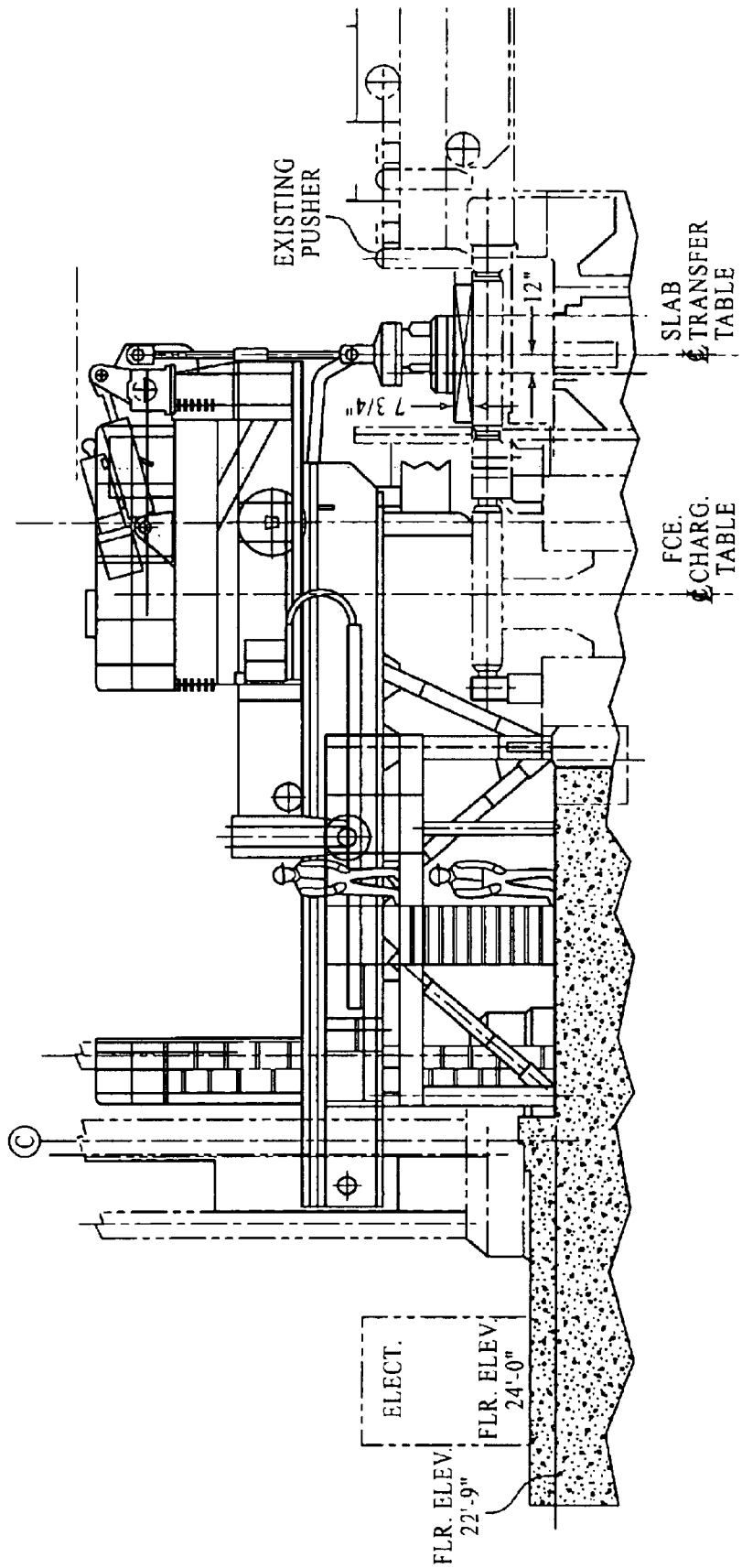
Figure 10:
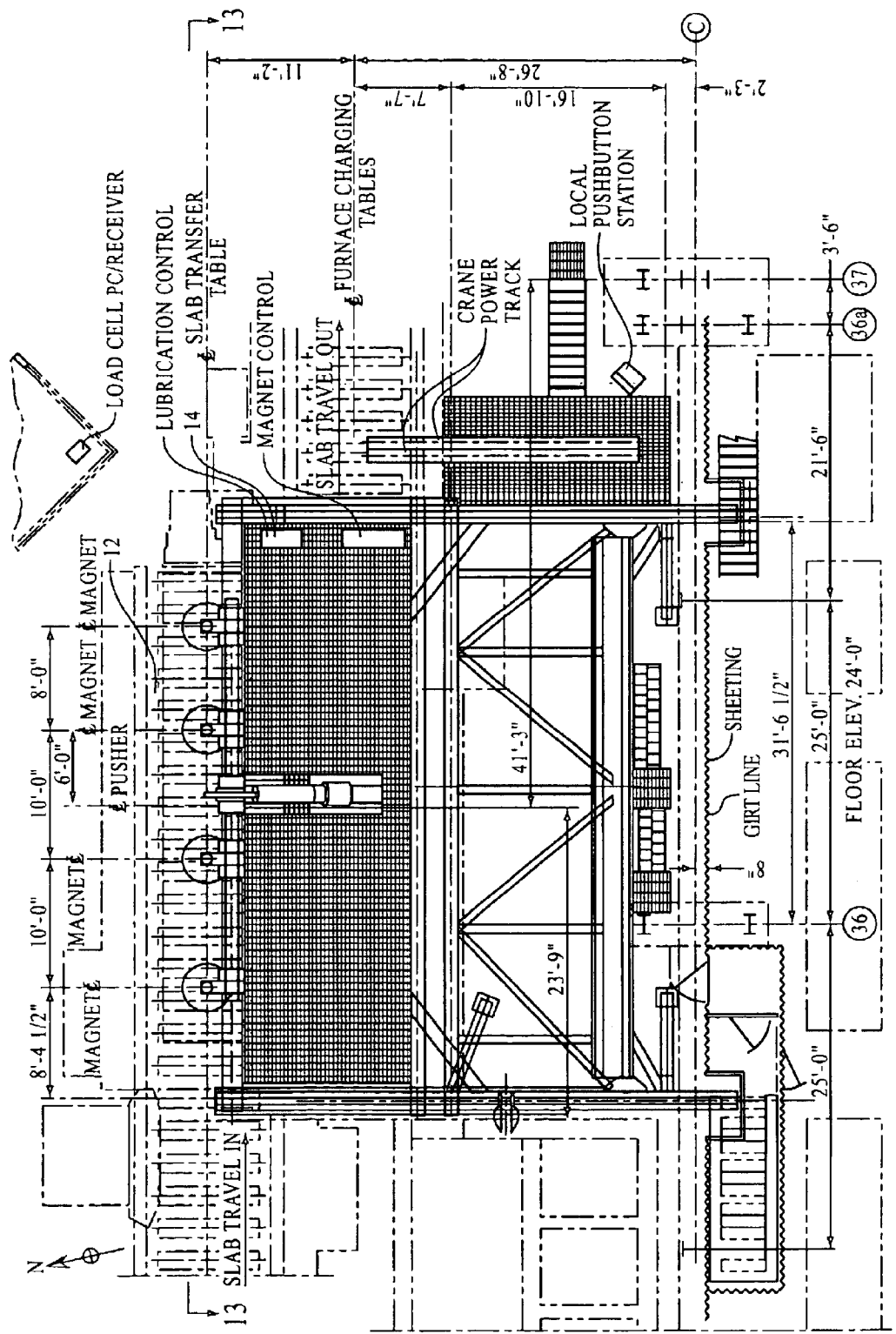
FIG. 10 is a top view showing the system of the present invention having the electromagnets positioned over the slab transfer table.

In operation, an overhead crane (not illustrated) deposits a stack of slabs S upstream of the unpiler table 12 (FIGS. 1 and 3). The stack is transferred to the unpiler table 12 by conveyor roller tables (FIGS. 1 and 3). The trolley mechanism 18 propelled by the power drive wheels 20 positions the electromagnets 30 over the slab stack on the unpiler table 12 (FIG. 6). The hydraulic actuator 32 advances causing the center lever arm 34 to pivot, thus, causing the horizontal shaft 24 to rotate which in turn causes the lever arms 26 to pivot downwardly. Pivoting of the lever arms 26 lowers the vertical rods 28 and thus, the electromagnets 30 so that at least two are in magnetic contact with the topmost slab on the stack (FIGS. 7 and 10). The number of electromagnets 30 in magnetic contact with the topmost slab depends on the length of the slab (and the number and arrangement of the electromagnets). It is not necessary for the electromagnets 30 to come in physical contact with the slab in order for the slab to be transferred by the electromagnets 30. The hydraulic actuator 32 then retracts causing the center lever arm 34 to pivot, thus, causing the horizontal shaft 24 to rotate which in turn causes the lever arms 26 to pivot. Pivoting of the unequally spaced lever arms 26 raises the vertical rods 28 and thus, the electromagnets 30 so that the topmost slab is lifted off of the stack. Meanwhile the load cells 48 weigh the slab and transmit the weight data to the control unit. The trolley mechanism 18 then retracts and positions the slab over the furnace charging table 14 (FIG. 5). The electromagnets 30 now lower and release the slab onto the furnace charging table 14.

If not otherwise stated herein, it may be assumed that all components and/or processes described heretofore may, if appropriate, be considered to be interchangeable with similar components and/or processes disclosed elsewhere in the specification, unless an indication is made to the contrary. It should be appreciated that the apparatus and methods of the present invention may be configured and conducted as appropriate for the application.

What is claimed is:

1. A system for transferring slabs from a stack of slabs to a furnace charging table comprising:
    a carriage selectively positionable over said stack of slabs and over said furnace charging table;
    a plurality of electromagnets coupled to said carriage to lift a slab off of said stack of slabs and transfer it to said furnace charging table;
    wherein each said electromagnet is connected to a vertical rod and each said vertical rod is connected to a horizontal shaft; and
    stabilizing means for limiting sway of at least one of the vertical rods.

2. The system of claim 1 wherein said stabilizing means comprises a stabilization arm connected to each vertical rod.

3. The system of claim 2 wherein each stabilization arm is pivotally connected to said carriage and to at least one of the vertical rods.

4. A system for transferring slabs from a stack of slabs to a furnace charging table comprising:
    a carriage selectively positionable over said stack of slabs and over said furnace charging table;
    a plurality of electromagnets to said carriage to lift a slab off of said stack of slabs and transfer it to said furnace charging table;
    wherein each said electromagnet is connected to a vertical rod and each said vertical rod is connected to a horizontal shaft; and
    a plurality of stabilization arms each pivotally connected to said carriage and to one of said vertical rods.

5. The system of claim 4 wherein the vertical rods are unequally spaced apart from each other.

6. The system of claim 4 further comprising a load cell connected to at least one vertical rod for weighing the slabs.

7. A system for transferring slabs from a stack of slabs to a furnace charging table comprising:
    a carriage selectively positionable over said stack of slabs and over said furnace charging table;
    a plurality of electromagnets coupled to said carriage to lift a slab off of said stack of slabs and transfer it to said furnace charging table; and wherein each said electromagnet is connected to a vertical rod;

wherein each electromagnet is suspended by at least one chain linkage having one end connected to said electromagnet and the opposite end connected to a horizontal disk pivotally connected to the lower end of the vertical rod.

8. A system for transferring slabs from a stack of slabs to a furnace charging table comprising:

a carriage selectively positionable over said stack of slabs and over said furnace charging table;

a plurality of electromagnets coupled to said carriage to lift a slab off of said stack of slabs and transfer it to said furnace charging table; and wherein each said electromagnet is connected to a vertical rod and each said vertical rod is connected to a horizontal shaft;

wherein each vertical rod is connected to said horizontal shaft by a lever arm.

9. The system of claim 8, further comprising an actuator connected to a center lever arm, said center lever arm being connected to the horizontal shaft, wherein said actuator causes at least one of the vertical rods to raise and lower.

10. A system for transferring slabs from a stack of slabs comprising:

a carriage selectively positionable over said stack of slabs at a first position and a second position spaced from the first position;

a plurality of electromagnets coupled to said carriage to lift a slab off of said stack of slabs and transfer it to said second position;

wherein each said electromagnet is connected to a vertical rod; and stabilizing means for limiting sway of at least one of the vertical rods.

11. A system for transferring slabs from a stack of slabs comprising:

a carriage selectively positionable over said stack of slabs at a first position and a second position spaced from the first position;

a plurality of electromagnets coupled to said carriage to lift a slab off of said stack of slabs and transfer it to said second position;

wherein each said electromagnet is connected to a vertical rod; and a plurality of stabilization arms each pivotally connected to said carriage and to one of said vertical rods.

* * * * *